US007580958B2

(12) United States Patent
Chen et al.

(10) Patent No.: US 7,580,958 B2
(45) Date of Patent: Aug. 25, 2009

(54) SUPPORTING MULTIPLE VERSIONS OF A ROUTINE

(75) Inventors: Yao-Ching Stephen Chen, Saratoga, CA (US); Curt Lee Cotner, Gilroy, CA (US); Baoqiu Cui, San Jose, CA (US); Tammie Dang, Morgan Hill, CA (US); Joe Cheng-yu Huang, San Jose, CA (US); Claire Willey McFeely, San Jose, CA (US); Robert Thomas Miller, San Jose, CA (US); Manogari Nogi Simanjuntak, San Jose, CA (US); Yumi Kimura Tsuji, San Jose, CA (US); Xiaoyu Yang, San Jose, CA (US); Jay A. Yothers, Gilroy, CA (US); Margaret Alice Zagelow, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 11/156,509

(22) Filed: Jun. 17, 2005

(65) Prior Publication Data

US 2006/0288052 A1 Dec. 21, 2006

(51) Int. Cl.
G06F 12/00 (2006.01)
G06F 17/30 (2006.01)

(52) U.S. Cl. .................................. 707/201; 707/203
(58) Field of Classification Search ................ 707/201, 707/203
See application file for complete search history.

(56) References Cited

U.S. PATENT DOCUMENTS

| | | | | |
|---|---|---|---|---|
| 5,375,237 A | * | 12/1994 | Tanaka et al. | 707/102 |
| 5,396,623 A | * | 3/1995 | McCall et al. | 707/101 |
| 5,491,818 A | * | 2/1996 | Malatesta et al. | 707/201 |
| 5,584,024 A | * | 12/1996 | Shwartz | 707/4 |
| 5,717,924 A | * | 2/1998 | Kawai | 707/102 |
| 5,754,785 A | * | 5/1998 | Lysik et al. | 717/170 |
| 5,920,725 A | * | 7/1999 | Ma et al. | 707/203 |
| 6,115,704 A | | 9/2000 | Olson et al. | |
| 6,606,627 B1 | | 8/2003 | Guthrie et al. | |
| 6,886,018 B1 | * | 4/2005 | Boudris et al. | 707/203 |
| 2002/0199173 A1 | | 12/2002 | Bowen | |
| 2005/0177570 A1 | * | 8/2005 | Dutta et al. | 707/9 |

* cited by examiner

*Primary Examiner*—Vincent Boccio
(74) *Attorney, Agent, or Firm*—Janaki K. Davda; Konrad Raynes & Victor LLP (57) ABSTRACT

Techniques are provided for supporting versions of a routine. A first version of the routine is created. A second version of the routine is generated in response to receiving an alter statement including an add version clause. The second version of the routine is activated in response to receiving an alter statement including an activate version clause.

24 Claims, 6 Drawing Sheets

SUPPORTING MULTIPLE VERSIONS OF A ROUTINE

BACKGROUND

1. Field

Embodiments relate to supporting multiple versions of a routine.

2. Description of the Related Art

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

A query may be described as a request for information from a database based on specific conditions.

An SQL stored procedure may be described as a procedure written with SQL statements. The use of SQL stored procedures for business applications has brought about the need to provide capability to support the existence of and the maintenance of different variations of an SQL stored procedure for the development, test, and production environments. An SQL stored procedure is a type of SQL routine.

An SQL routine may be described as a database object that encapsulates procedural logic and SQL statements and is stored on a database server. An SQL routine may be a procedure (e.g., a stored procedure) or a function (e.g., a user defined function). A user-defined function may be described as a function defined by a user.

An SQL routine includes source code, executable code, and a definition. The definition is stored in a catalog, which is stored in a database and contains information about the database, such as descriptions of tables, views, and indexes stored in the database and that are referenced by SQL statements in the routine body. The source code may be described as including the body of the routine (also called the specification). Existing support of SQL routines requires that, in order to make a change to the body of the routine, the source code of the routine be maintained outside of a database. Furthermore, to make a change to the body of the routine, the definition is removed from the catalog in the database, changes are made to the routine specification, and then the routine is re-created with a new definition in the catalog. This support allows for a single definition of a routine at any point in time at the Relational DataBase Management System (RDBMS). Also, since existing techniques of changing the body require the routine to be 'dropped', there are undesirable effects, such as losing grants of privileges on the routine to other users.

Additionally, multiple variations of a routine may be defined and used today using the following mechanisms: 1) different high level qualifiers for the routine name or 2) different load modules or load libraries.

A high level qualifier may be described as a part of a name for a routine. For example, for a routine named ABC, high level qualifiers X and Y, respectively, may be added to different variations of the routine (e.g., X.ABC and Y.ABC may be names of the different variations of the routine). However, this may require that the entire qualified name be specified on invocation of the routine to ensure that the desired variation of the routine is used. In some cases, if the qualifier is not explicitly specified, then the RDBMS attempts to select the right qualifier using an SQL path. If the SQL path is properly setup, then the correct variation is invoked. The user can set the contents of the SQL path to affect which qualifier is chosen. Multiple variations of a routine may have differences in their parameter lists, and some of these differences may require the use of different high level qualifiers.

Outside of the database, multiple variations may be defined using different load modules or load libraries. In particular, a CREATE statement creating the routine may specify an external name (i.e., in an EXTERNAL NAME clause) that points to a particular load module that stores the routine. That is, the routine definition may specify (i.e., by an indirect link) the desired load module in the EXTERNAL NAME clause. However, both the load modules and load libraries are kept and managed outside of the database, which requires more management and more processing (e.g., to load the routine).

These conventional mechanisms for supporting multiple variations of a routine involve multiple setup steps and a level of complexity in the process for building the routine.

Therefore, there is a need in the art for improved support of multiple versions of a routine.

SUMMARY

Provided are a method, article of manufacture, and system for supporting versions of a routine. A first version of the routine is created. A second version of the routine is generated in response to receiving an alter statement including an add version clause. The second version of the routine is activated in response to receiving an alter statement including an activate version clause.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of embodiments.

Figure 1:
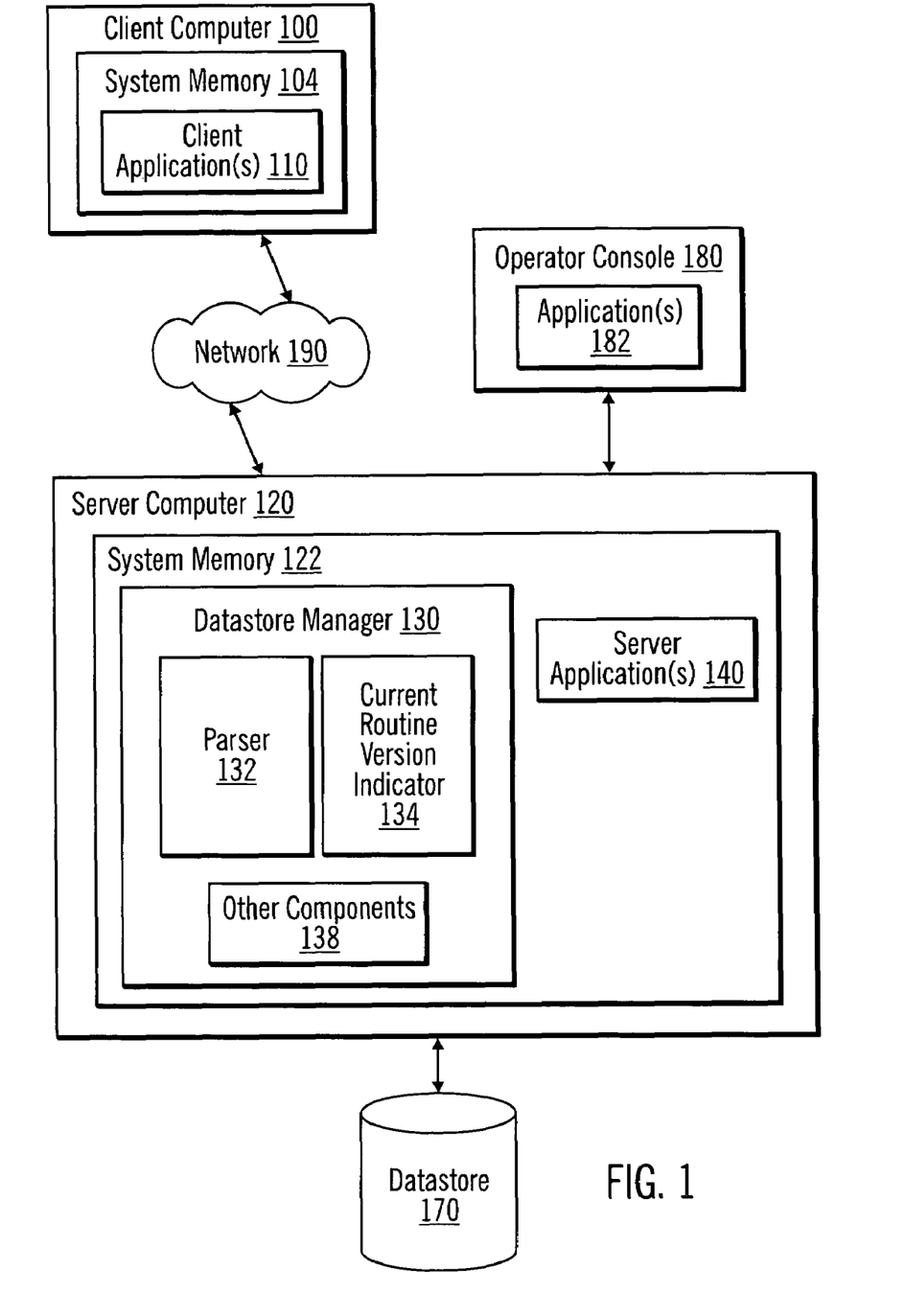
FIG. 1 illustrates details of a computer architecture in which certain embodiments may be implemented.

FIG. 1 illustrates details of a computer architecture in which certain embodiments may be implemented. A client computer 100 is connected via a network 190 to a server computer 120. The client computer 100 includes system memory 104, which may be implemented in volatile and/or non-volatile devices. One or more client applications 110 (i.e., computer programs) are stored in the system memory 104 for execution by a processor (e.g., a Central Processing Unit (CPU)) (not shown). At least one client application includes new SQL statements provided by embodiments of the invention.

The server computer 120 includes system memory 122, which may be implemented in volatile and/or non-volatile devices. System memory 122 stores a datastore manager 130 (e.g., a Relational DataBase Management System (RDBMS)). The datastore manager 130 includes a parser 132, a current routine version indicator 134, and other components 138. The parser 132 is capable of recognizing and parsing new SQL statements provided by embodiments of the invention. Also, the datastore manager 130 is capable of executing the new SQL statements provided by embodiments of the invention. System memory 122 also stores one or more server applications 140. These computer programs that are stored in system memory 122 are executed by a processor (e.g., a Central Processing Unit (CPU)) (not shown). The server computer 120 provides the client computer 100 with access to data in a datastore 170. In alternative embodiments, the computer programs may be implemented as hardware, software, or a combination of hardware and software.

The client computer 100 and server computer 120 may comprise any computing device known in the art, such as a server, mainframe, workstation, personal computer, hand held computer, laptop telephony device, network appliance, etc.

The network 190 may comprise any type of network, such as, for example, a Storage Area Network (SAN), a Local Area Network (LAN), Wide Area Network (WAN), the Internet, an Intranet, etc.

The datastore 170 may comprise an array of storage devices, such as Direct Access Storage Devices (DASDs), Just a Bunch of Disks (JBOD), Redundant Array of Independent Disks (RAID), virtualization device, etc.

Figure 2:
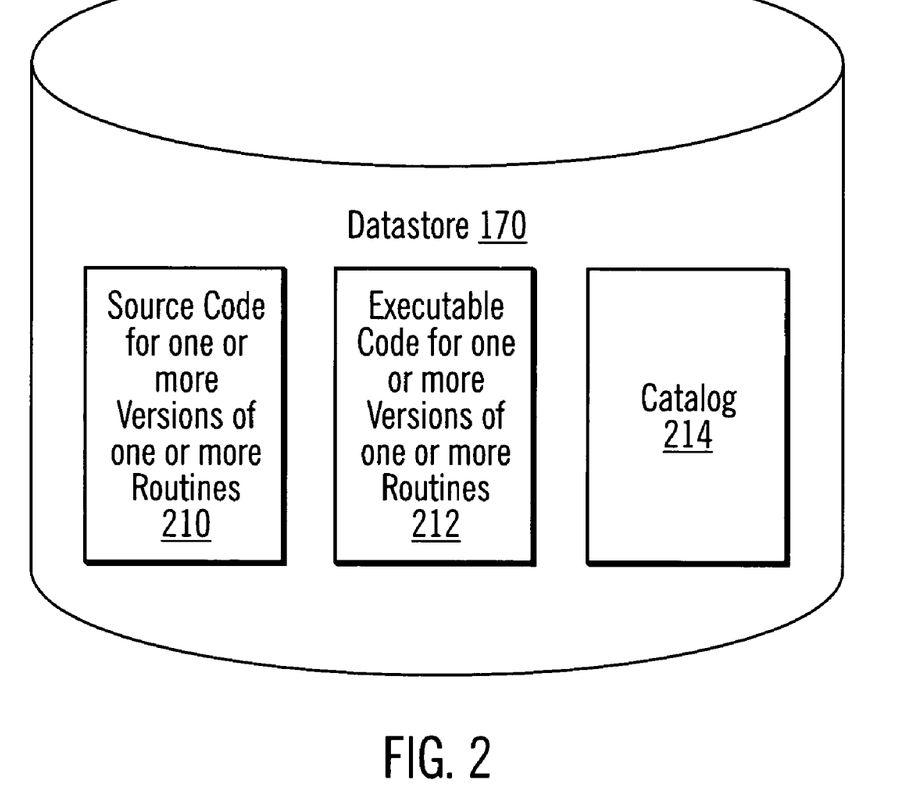
FIG. 2 illustrates further details of a datastore in accordance with certain embodiments.

FIG. 2 illustrates further details of a datastore in accordance with certain embodiments. The datastore 170 includes source code 210 for one or more versions of one or more routines and executable code 212 for the one or more versions of the one or more routines. Thus, the source code 210 and executable code 212 may be for different versions of the same routine. Thus, multiple versions of one routine may be stored in the datastore 170 simultaneously. The datastore 170 also includes a catalog 214, which identifies an active version of a routine (i.e., the version of the routine to be invoked by the datastore manager 130).

Figure 3:
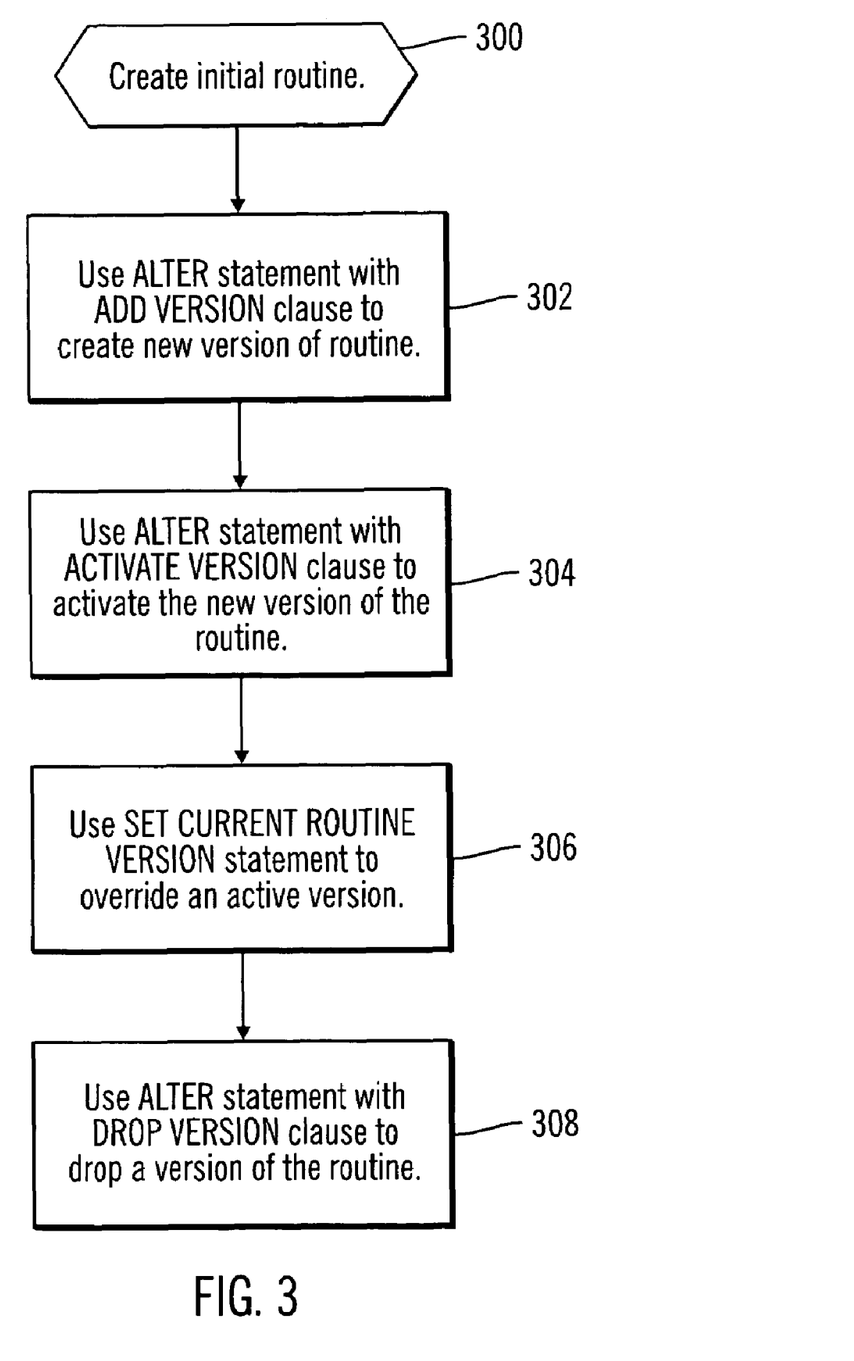
FIG. 3 illustrates logic for writing an application that defines and maintains versions of a routine in accordance with certain embodiments.

FIG. 3 illustrates logic for writing an application (e.g., client application 110) that defines and maintains versions of a routine in accordance with certain embodiments. Control begins in block 300 with creation of the initial routine. In block 302, an ALTER statement with an ADD VERSION clause is used to create a new version of the routine. Each version of a routine may have a different specification of options and/or a different body of the routine. The body of the routine contains the logic of the version (e.g., SQL statements that are to be executed when the version of the routine is invoked). The ADD VERSION clause specifies a version identifier and, optionally, specifies the body of the routine. The add version clause is used to create a new version that has a same number and a same type of parameters as each other version of the routine.

In block 304, an ALTER statement with an ACTIVATE VERSION clause is used to activate the new version of the routine. The ACTIVATE VERSION clause specifies the version identifier of the version to be activated. An activated version of a routine is one that is to be used when the routine is invoked. One or more versions of a routine may exist at any point in time at a server computer, but one version of a routine is considered to be the active version. When a routine is first defined (with the CREATE statement), that initial version is considered the active version of the routine. Any of the defined versions of a routine may be designated the active version by issuing the ALTER statement specifying the ACTIVATE VERSION clause that identifies the desired version.

In block 306, a SET CURRENT ROUTINE VERSION statement is used to override an active version of a routine. That is; the active version of the routine may be temporarily overridden by setting a current routine version indicator 134 (e.g., a register) with the desired version identifier.

In block 308, an ALTER statement with a DROP VERSION clause is used to drop a version of the routine that is no longer desired.

Thus, embodiments use a CREATE statement to establish a first version of a routine as a new object and use ALTER statements with new clauses provided by embodiments to define, change or replace a version of a routine.

Examples are provided herein merely to illustrate embodiments, and it is to be understood that the examples are not intended to limit the embodiments in any manner. In certain embodiments, a first version of a routine is implicitly given the name 'V1'. For example, assume that a new routine to be created is a procedure and the initial version is named 'V1'. Example Statement (1) creates version V1 of a procedure.

Statement (1)

CREATE PROCEDURE TEST.UPDATE_SALARY_1 (IN EMPLOYEE_NUMBER CHAR(10), IN RATE DECIMAL(6,2))
LANGUAGE SQL
MODIFIES SQL DATA
UPDATE EMP SET SALARY = SALARY * RATE
    WHERE EMPNO = EMPLOYEE_NUMBER

Embodiments re-implement the internal support for the CREATE statement and set up the infrastructure to allow additional versions of a routine to be defined in the datastore 170. In Statement (1), the term 'TEST' is the qualifier for the procedure name 'UPDATE_SALARY_1'. In certain embodiments, the version identifier is V1 by default, but a VERSION clause may be used in the CREATE statement to specify a different version identifier.

Embodiments enable defining and maintaining additional versions of a routine (i.e., supporting multiple versions), where each version has the same routine name and high-level qualifier. The alternate versions for the routine co-exist in the datastore 170, providing an easy way to fall back to another version of a routine.

Example Statement (2) defines an alternate version of version V1 by specifying an ADD VERSION clause and by specifying a new body of the routine (i.e., the logic of the new version):

Statement (2)

ALTER PROCEDURE TEST.UPDATE_SALARY_1
ADD VERSION V2 (IN EMPLOYEE_NUMBER CHAR(10), IN RATE DECIMAL(6,2))
UPDATE EMP SET SALARY = SALARY * (RATE*10)
WHERE EMPNO = EMPLOYEE_NUMBER

Having multiple versions enables a user to work with (e.g., modify) one version without impacting other users (i.e., "offline"). For example, a user may want to modify a version that is not the active version, test that modified version (using the SET CURRENT ROUTINE VERSION statement), and then activate that version so that all users may use that modified version.

Example Statement (3) changes the body of the routine (i.e., logic) of that second version V2. Because the change is to the body of the routine of the version, Statement (3) specifies a REPLACE clause to indicate that the body of the routine is to be replaced. With the REPLACE clause, for any options that are not specified, default values are used. Additionally, in this example, a different option (QUALIFIER) is specified for this version of the procedure so that the new qualifier is 'NEWSCHEMA'.

Statement (3)

ALTER PROCEDURE TEST.UPDATE_SALARY_1
REPLACE VERSION V2 (IN EMPLOYEE_NUMBER CHAR(10),
IN RATE DECIMAL(6,2))
QUALIFIER NEWSCHEMA
UPDATE EMP SET SALARY = SALARY * RATE
WHERE EMPNO = EMPLOYEE_NUMBER

Example Statement (4) illustrates how the active version of the routine may be temporarily overridden by setting a current routine version indicator 134 (e.g., a register) with the desired version identifier. When a routine is invoked, if a version of the routine specified by the version identifier in the current routine version indicator 134 exists, then that version is invoked, otherwise the active version of the routine (e.g., as indicated in a datastore catalog) is invoked. Example Statement (4) changes the value of a CURRENT ROUTINE VERSION special register so that version V2 of this procedure is invoked:

Statement (4)

SET CURRENT ROUTINE VERSION = V2

The SET CURRENT ROUTINE VERSION statement switches which version of a routine is active without impacting invoking applications, and without impacting other users. This provides a way for a user to test out a new version before activating it for all users. Once the new version is tested successfully, the ALTER statement may be issued with an ACTIVATE VERSION clause to make the new version available to all users.

Example Statement (5) activates version V2 that was defined in Statement (2) using an ACTIVATE VERSION clause.

Statement (5)

ALTER PROCEDURE TEST.UPDATE_SALARY_1
ACTIVATE VERSION V2

The ALTER statement of Statement (5) establishes version V2 as the active version for procedure TEST.UPDATE_SALARY_1. In particular, the ACTIVATE VERSION clause identifies which version of a routine is to be used when the routine is invoked (e.g., with a CALL statement for a procedure). The ACTIVATE VERSION clause switches which version of a routine is active without impacting invoking applications.

Thus, in this example, a user defined version V2 and then realized that version V2 needed to be modified. So, the user modified version V2 with Statement (3). Then, the user used the SET CURRENT ROUTINE VERSION Statement (4) to test version V2. Using Statement (5), the user activated version V2 for use by everyone.

Example Statement (6) describes how a version may be dropped with an ALTER statement by specifying a DROP VERSION clause.

Statement (6)

ALTER PROCEDURE TEST.UPDATE_SALARY_1
DROP VERSION V1

With Statement (6), version V1 is dropped.

During the application life cycle, as a program is designed, coded, tested and iteratively changed, and it is useful to have multiple variations of a routine definition. Embodiments enable storing the source code and executable code of a routine in the datastore 170. Also, alternate versions for a routine co-exist in the datastore 170, which enables fall back to a previous variation of a routine without impacting invoking applications. Embodiments also provide execution management (i.e., if multiple versions are defined, one version is active) and allow for the explicit definition of multiple variations of a routine. With embodiments, as changes are made to the definition of a variation of a routine, the executable form is regenerated automatically as needed. Embodiments are useful to the maintenance of 24×7 production systems.

Embodiments identify which version of a routine to use when the routine is invoked. Embodiments enable switching from one version of a routine that is active to another version, without impacting invoking applications. Embodiments provide an override capability to determine which version of a routine is to be invoked using a current routine version indicator 134. Embodiments also allow changes to be made to the definition of a version of a routine and allow for a version to be removed entirely from a datastore.

Embodiments are applicable to various types of routines, such as stored procedures and user-defined functions. Additionally, a method may be described as a database object that encapsulates logic that provides behavior for structured types. A trigger may be described as a database object that is associated with a base table or view and that defines a rule. For example, the rule may consist of a set of SQL statements that run when an insert, update, or delete database operation occurs on the associated base table or view. The techniques of embodiments described herein are applicable to methods and triggers.

Figure 4:
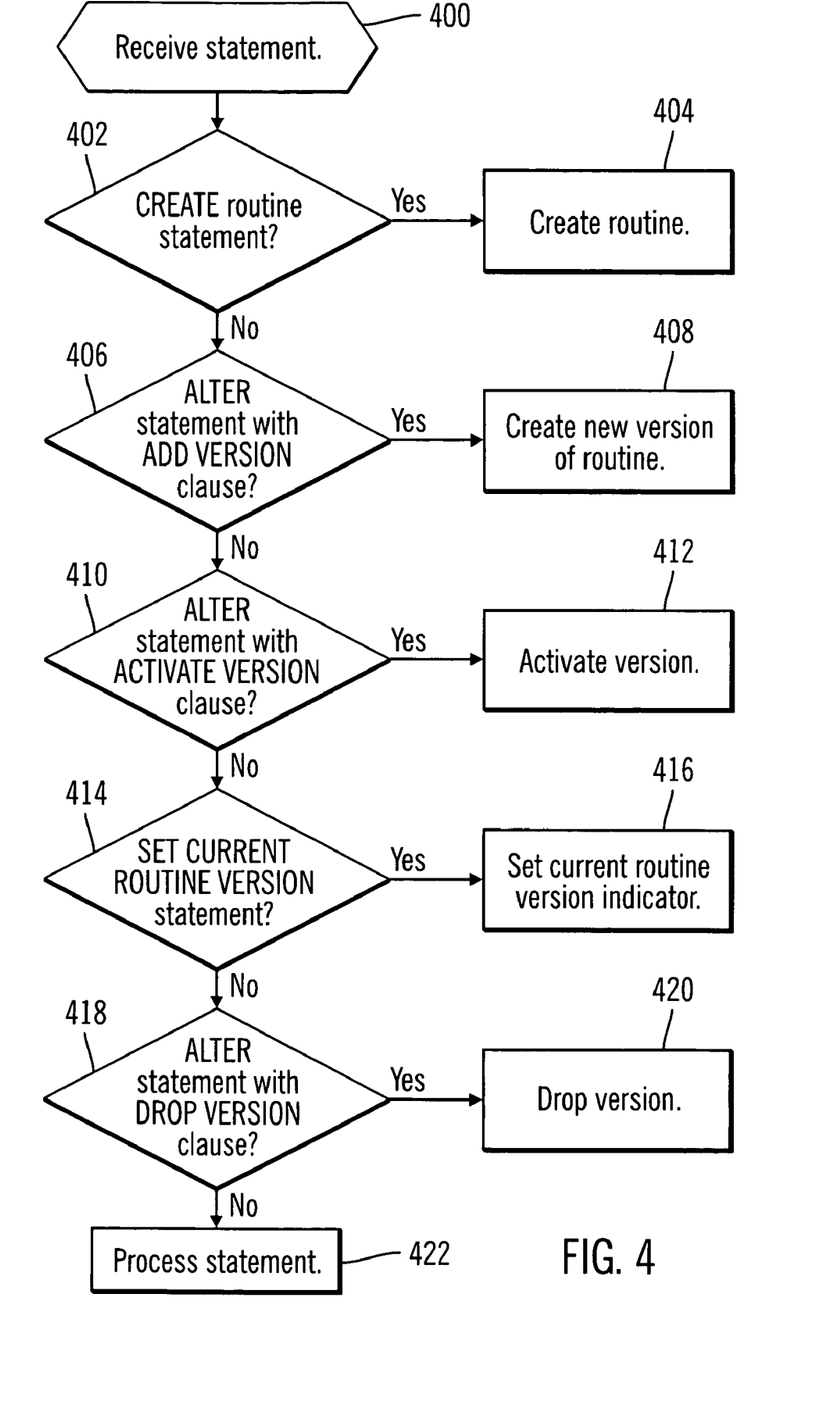
FIG. 4 illustrates logic performed by a datastore manager in accordance with certain embodiments.

FIG. 4 illustrates logic performed by the datastore manager 130 in accordance with certain embodiments. Control begins at block 400 with the datastore manager 130 receiving a statement. In block 402, the datastore manager 130 determines whether the statement is a CREATE routine statement. The type of routine may be, for example, a stored procedure or a user defined function. If so, processing continues to block 404, otherwise, processing continues to block 406. In block 404, the datastore manager 130 creates the routine.

In block 406, the datastore manager 130 determines whether the statement is an ALTER statement with an ADD VERSION clause. If so, processing continues to block 408, otherwise, processing continues to block 410. In block 408, the datastore manager 130 creates a new version of the routine.

In block 410, the datastore manager 130 determines whether the statement is an ALTER statement with an ACTIVATE VERSION clause. If so, processing continues to block 412, otherwise, processing continues to block 414. In block 412, the datastore manager 130 activates the identified version of the routine.

In block 414, the datastore manager 130 determines whether the statement is a SET CURRENT ROUTINE VERSION statement. If so, processing continues to block 416, otherwise, processing continues to block 418. In block 416, the datastore manager 130 sets the current routine version indicator 134 to the identified version.

In block 418, the datastore manager 130 determines whether the statement is a ALTER statement with a DROP VERSION clause. If so, processing continues to block 420, otherwise, processing continues to block 422. In block 420, the datastore manager 130 drops the identified version. In block 422, the datastore manager 130 processes the received statement.

Figure 5:
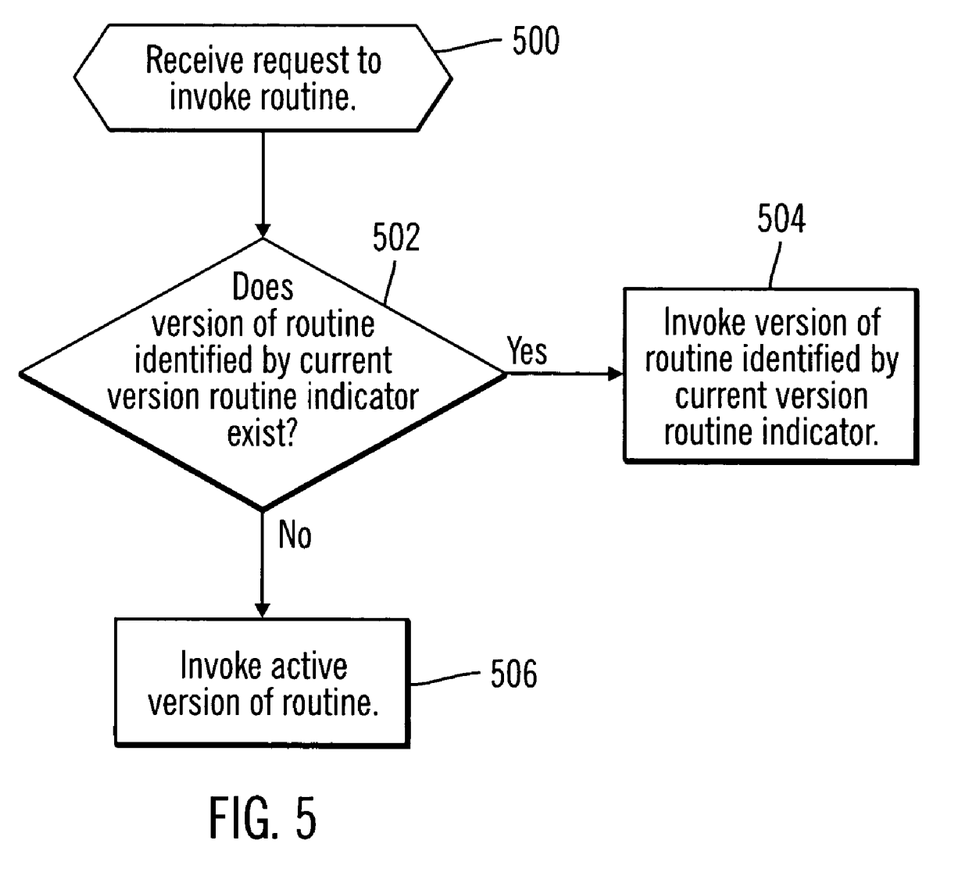
FIG. 5 illustrates logic performed by a datastore manager when a routine is invoked.

FIG. 5 illustrates logic performed by the datastore manager 130 when a routine is invoked. Control begins at block 500 with the datastore manager 130 receiving a request to invoke a routine. In block 502, the datastore manager 130 determines whether a version of routine identified by a current version routine indicator 134 exists. If so, processing continues to block 504, otherwise, processing continues to block 506. In block 504, if a version of the routine exists with the version indicator specified in the current routine version indicator 134, then the datastore manager 130 invokes the version of the routine identified by the current version routine indicator. In block 506, the datastore manager invokes the active version of the routine.

Thus, when a routine is invoked, the particular version of the routine that is used is either the currently active version or a version identified with the override option using the current routine version indicator 134.

IBM is a registered trademark and/or common law mark of International Business Machines Corporation in the United States and/or foreign countries.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals or light propagating through space, radio waves, infrared signals, optical signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

Certain embodiments may be directed to a method for deploying computing infrastructure by a person or automated processing integrating computer-readable code into a computing system, wherein the code in combination with the computing system is enabled to perform the operations of the described embodiments.

The term logic may include, by way of example, software or hardware and/or combinations of software and hardware.

The logic of FIGS. 3 and 4 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3 and 4 may be implemented in software, hardware, programmable and non-programmable gate array logic or in some combination of hardware, software, or gate array logic.

Figure 6:
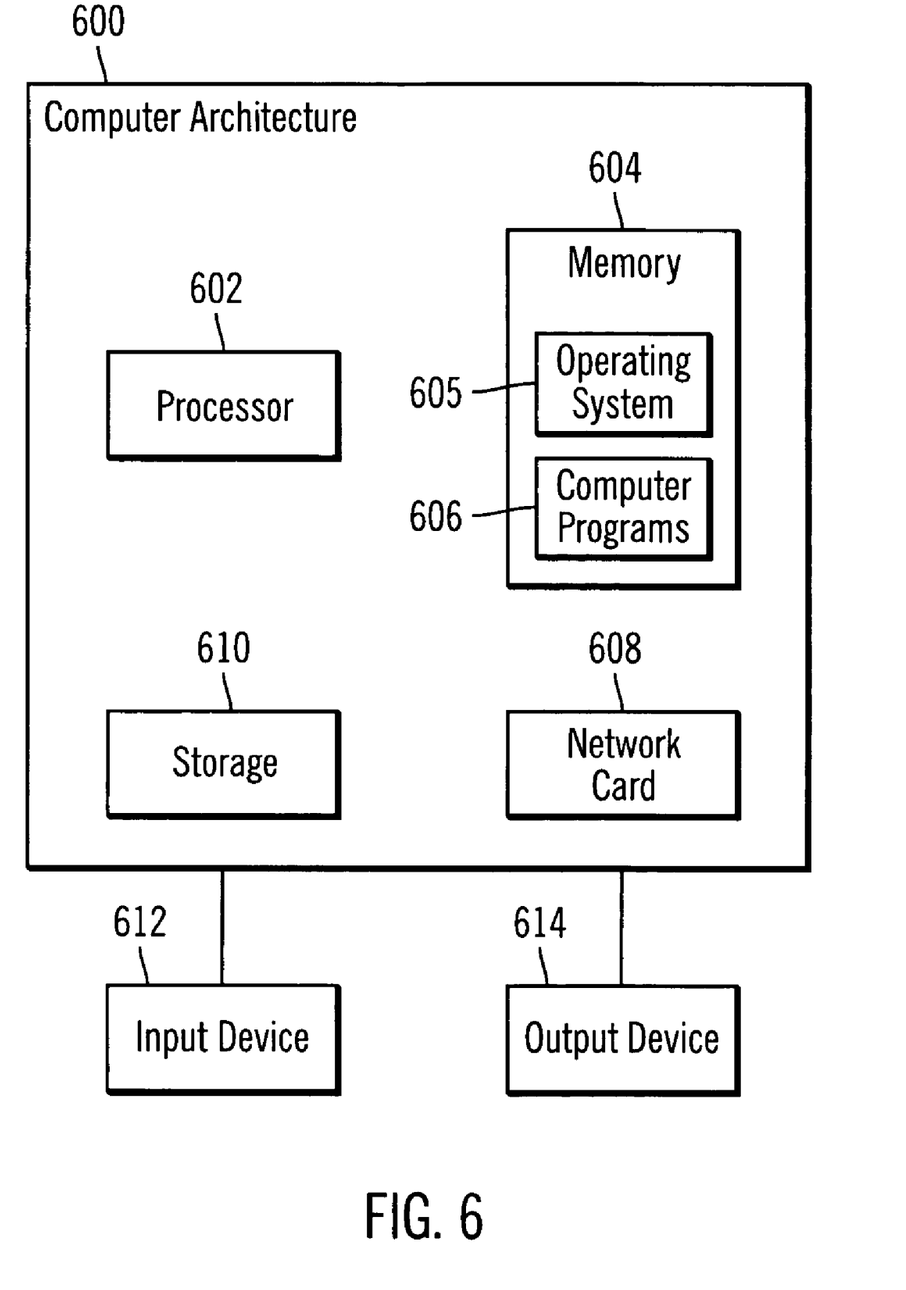
FIG. 6 illustrates an architecture of a computer system that may be used in accordance with certain embodiments.

FIG. 6 illustrates an architecture 600 of a computer system that may be used in accordance with certain embodiments. Client computer 100, server computer 120, and/or operator console 180 may implement architecture 600. The computer architecture 600 may implement a processor 602 (e.g., a microprocessor), a memory 604 (e.g., a volatile memory device), and storage 610 (e.g., a non-volatile storage area, such as magnetic disk drives, optical disk drives, a tape drive, etc.). An operating system 605 may execute in memory 604. The storage 610 may comprise an internal storage device or an attached or network accessible storage. Computer programs 606 in storage 610 may be loaded into the memory 604 and executed by the processor 602 in a manner known in the art. The architecture further includes a network card 608 to enable communication with a network. An input device 612 is used to provide user input to the processor 602, and may include a keyboard, mouse, pen-stylus, microphone, touch sensitive display screen, or any other activation or input mechanism known in the art. An output device 614 is capable of rendering information from the processor 602, or other component, such as a display monitor, printer, storage, etc. The computer architecture 600 of the computer systems may include fewer components than illustrated, additional components not illustrated herein, or some combination of the components illustrated and additional components.

The computer architecture 600 may comprise any computing device known in the art, such as a mainframe, server, personal computer, workstation, laptop, hand held computer, telephony device, network appliance, virtualization device, storage controller, etc. Any processor 602 and operating system 605 known in the art may be used.

The foregoing description of embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments can be made without departing from the spirit and scope of the invention, the embodiments reside in the claims hereinafter appended or any subsequently-filed claims, and their equivalents.

What is claimed is:

1. A method for supporting versions of a routine, comprising:
creating a first version of the routine in response to receiving a create statement, wherein the first version is identified as an active version in a catalog in a datastore when created in response to receiving the create statement, wherein the first version of the routine is stored in the datastore;
receiving multiple alter statements that include an add version clause;
for each of the multiple alter statements that include an add version clause that is received, creating a new version of the routine, wherein multiple versions of the routine are stored in the datastore simultaneously, wherein the catalog in the datastore identifies one version of the multiple versions as an active version of the routine, wherein the active version identifies which version of the multiple versions of the routine to call when the routine is invoked;
activating a second version of the routine in response to receiving an alter statement including an activate version clause that specifies a version to be activated, wherein the catalog in the datastore identifies the second version as the active version of the routine;
receiving a request to invoke the routine;
in response to receiving the request to invoke the routine, determining whether a version of the routine identified by a current version routine indicator exists;
in response to determining that the version identified by the current routine version indicator exists, invoking the version of the routine identified by the current version routine indicator; and
in response to determining that the version identified by the current routine version indicator does not exist, invoking the second version of the routine that is identified as the active version.

2. The method of claim 1, wherein the add version clause of an alter statement is used to create the second version with a same number and a same type of parameters as the first version.

3. The method of claim 1, wherein the multiple versions of the routine are stored with a same routine name and a same high level qualifier.

4. The method of claim 1, further comprising:
dropping a version of the routine in response to receiving an alter statement including a drop version clause.

5. The method of claim 1, further comprising:
in response to receiving a set current routine version statement, setting the current routine version indicator to override the active version and to identify another version of the routine using a current routine version clause.

6. The method of claim 1, wherein the routine comprises one of a stored procedure and a user defined function.

7. The method of claim 1, wherein the second version modifies the body of the first version, wherein the body includes statements to be executed when the second version of the routine is invoked.

8. The method of claim 1, wherein the second version modifies one or more options of the first version.

9. An article of manufacture for supporting versions of a routine, wherein the article of manufacture comprises a computer readable medium storing instructions, and wherein the article of manufacture is operable to:
create a first version of the routine in response to receiving a create statement, wherein the first version is identified as an active version in a catalog in a datastore when created in response to receiving the create statement, wherein the first version of the routine is stored in the datastore;
receive multiple alter statements that include an add version clause;
for each of the multiple alter statements that include an add version clause that is received, create a new version of the routine, wherein multiple versions of the routine are stored in the datastore simultaneously, wherein the catalog in the datastore identifies one version of the multiple versions as an active version of the routine, wherein the active version identifies which version of the multiple versions of the routine to call when the routine is invoked;
activate a second version of the routine in response to receiving an alter statement including an activate version clause that specifies a version to be activated, wherein the catalog in the datastore identifies the second version as the active version of the routine;
receive a request to invoke the routine;
in response to receiving the request to invoke the routine, determine whether a version of the routine identified by a current version routine indicator exists;
in response to determining that the version identified by the current routine version indicator exists, invoke the version of the routine identified by the current version routine indicator; and
in response to determining that the version identified by the current routine version indicator does not exist, invoke the second version of the routine that is identified as the active version.

10. The article of manufacture of claim 9, wherein the add version clause of an alter statement is used to create the second version with a same number and a same type of parameters as the first version.

11. The article of manufacture of claim 9, wherein the multiple versions of the routine are stored with a same routine name and a same high level qualifier.

12. The article of manufacture of claim 9, wherein the article of manufacture is operable to:
drop a version of the routine in response to receiving an alter statement including a drop version clause.

13. The article of manufacture of claim 9, wherein the article of manufacture is operable to:
in response to receiving a set current routine version statement, set the current routine version indicator to override the active version and to identify another version of the routine using a current routine version clause.

14. The article of manufacture of claim 9, wherein the routine comprises one of a stored procedure and a user defined function.

15. The article of manufacture of claim 9, wherein the second version modifies the body of the first version, wherein the body includes statements to be executed when the second version of the routine is invoked.

16. The article of manufacture of claim 9, wherein the second version modifies one or more options of the first version.

17. A system for supporting versions of a routine, comprising:
hardware logic capable of causing operations to be performed, the operations comprising:
creating a first version of the routine in response to receiving a create statement, wherein the first version is identified as an active version in a catalog in a datastore when created in response to receiving the create statement, wherein the first version of the routine is stored in the datastore;

receiving multiple alter statements that include an add version clause;

for each of the multiple alter statements that include an add version clause that is received, creating a new version of the routine, wherein multiple versions of the routine are stored in the datastore simultaneously, wherein the catalog in the datastore identifies one version of the multiple versions as an active version of the routine, wherein the active version identifies which version of the multiple versions of the routine to call when the routine is invoked;

activating a second version of the routine in response to receiving an alter statement including an activate version clause that specifies a version to be activated, wherein the catalog in the datastore identifies the second version as the active version of the routine;

receiving a request to invoke the routine;

in response to receiving the request to invoke the routine, determining whether a version of the routine identified by a current version routine indicator exists;

in response to determining that the version identified by the current routine version indicator exists, invoking the version of the routine identified by the current version routine indicator; and in response to determining that the version identified by the current routine version indicator does not exist, invoking the second version of the routine that is identified as the active version.

18. The system of claim 17, wherein the add version clause of an alter statement is used to create the second version with a same number and a same type of parameters as the first version.

19. The system of claim 17, wherein the multiple versions of the routine are stored with a same routine name and a same high level qualifier.

20. The system of claim 17, wherein the operations comprise:

dropping a version of the routine in response to receiving an alter statement including a drop version clause.

21. The system of claim 17, wherein the operations comprise:

in response to receiving a set current routine version statement, setting the current routine version indicator to override the active version and to identify another version of the routine using a current routine version clause.

22. The system of claim 17, wherein the routine comprises one of a stored procedure and a user defined function.

23. The system of claim 17, wherein the second version modifies the body of the first version, wherein the body includes statements to be executed when the second version of the routine is invoked.

24. The system of claim 17, wherein the second version modifies one or more options of the first version.

* * * * *

UNITED STATES PATENT AND TRADEMARK OFFICE
CERTIFICATE OF CORRECTION

PATENT NO. : 7,580,958 B2  Page 1 of 1
APPLICATION NO. : 11/156509
DATED : August 25, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 469 days.

Signed and Sealed this

Fourteenth Day of September, 2010

David J. Kappos
*Director of the United States Patent and Trademark Office*